(12) United States Patent
Pontius

(10) Patent No.: US 6,739,434 B1
(45) Date of Patent: May 25, 2004

(54) LINKAGE FOR JOINING A LEVER TO A BRAKE CABLE

(75) Inventor: Kathryn Ann Pontius, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/423,460

(22) Filed: Apr. 25, 2003

(51) Int. Cl.$^7$ ................................................ F16D 5/00
(52) U.S. Cl. ..................... 188/2 D; 188/79.64; 74/502.4
(58) Field of Search ............................. 188/2 D, 72.1, 188/72.3, 72.4, 72.6, 72.9, 78, 79.54, 79.64, 105, 106 A, 325, 331; 74/501.5 R, 501.6, 502.4, 502.6

(56) References Cited

U.S. PATENT DOCUMENTS 5,720,367 A * 2/1998 Evans ..................... 188/79.64
2002/0153206 A1 * 10/2002 Basnett ..................... 188/2 D

FOREIGN PATENT DOCUMENTS

DE  3403990 A1 * 8/1985 ........... B60T/11/04
EP  1241370 A1 * 9/2002 ........... F16D/65/22

* cited by examiner

Primary Examiner—Matthew C. Graham
Assistant Examiner—Xuan Lan Nguyen
(74) Attorney, Agent, or Firm—Leo H. McCormick, Jr.; Warren Comstock

(57) ABSTRACT

An linkage for connecting a brake cable to an lever in a drum-in-hat park brake assembly. The linkage is defined by a continuous wire that is shaped into a first engagement section that is separated from a second engagement section by a center section. The first engagement section is define by a loop that extends from the center section while the second engagement section is defined by a hook with an end that is spaced apart from the center section a distance that is greater than a radius of the hook such that a resilient force is required to move the end in a plane away from the center section and thereafter receive a loop on the brake cable through which an actuation force is transmitted to move a lever and effect a brake application.

4 Claims, 2 Drawing Sheets

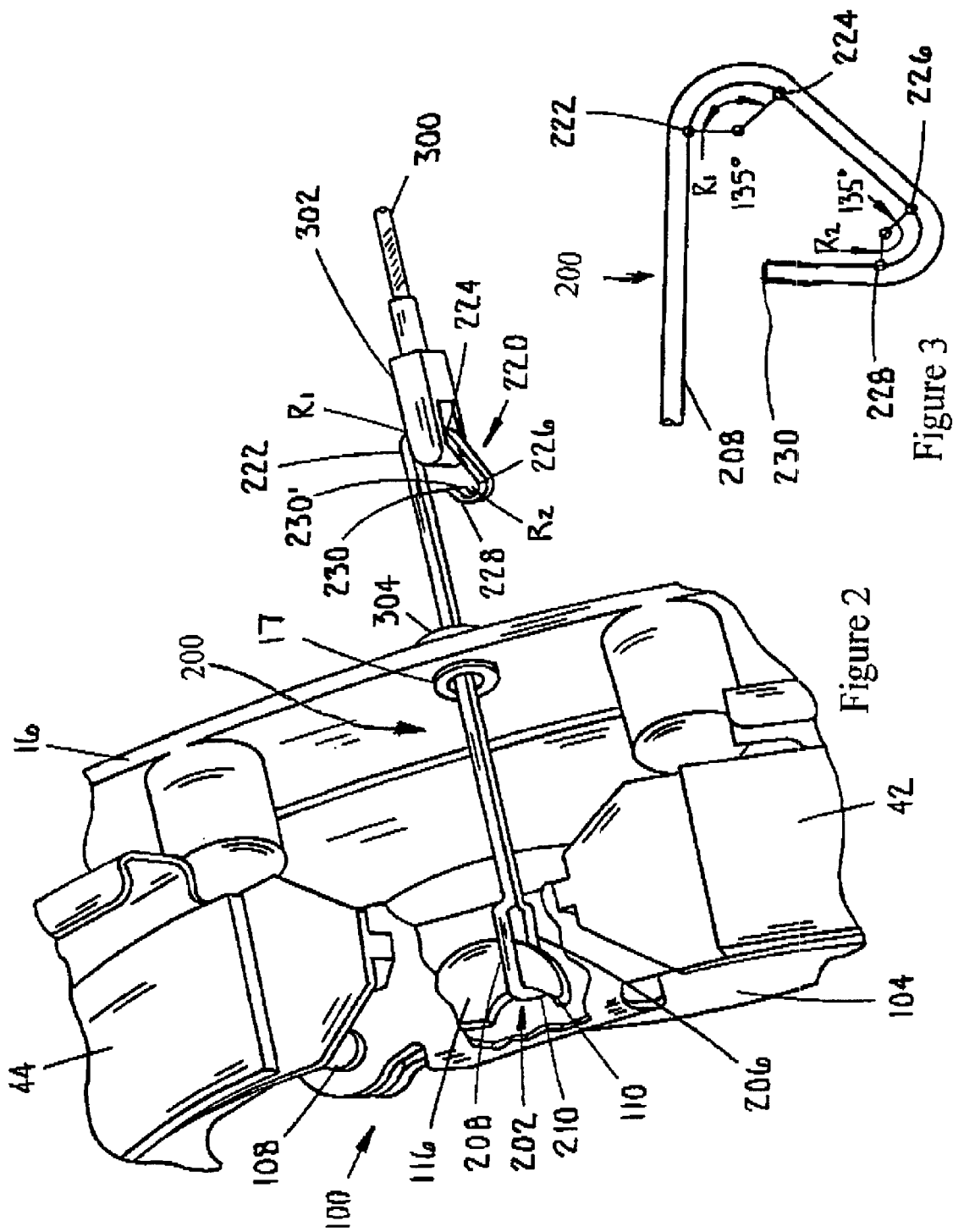

LINKAGE FOR JOINING A LEVER TO A BRAKE CABLE

This invention relates to a linkage for connecting a brake cable to a lever of an actuator for moving first and second brake shoes into engagement with a drum in drum-in-hat park brake.

BACKGROUND OF THE INVENTION

In a vehicle having four wheel disc brakes an overall cost saving may be achieved through the use of a drum-in-hat parking brake such as disclosed in U.S. Pat. No. 5,180,037 as many of the structural components for a conventional service brake may be used in a parking brake. In a study of parking brakes, it was summarized that less than twenty five precent of drivers effect a parking brake application on a regular basis and the use of a parking brake was even less in vehicles having an automatic transmissions. With such limited use, an initial thickness of the material of friction members for a parking brake remain essentially the same over the life of a vehicle. It is common practice to develop a typical high coefficient of friction for a friction lining for a parking brake as the coefficient of friction between the friction pads and drum is needed to hold a vehicle stationary in a parking brake application. The coefficient of friction for the friction pads being derived from a composition of materials mainly consisting of metal oxides, ceramic particles, carbon particles, fibers and other materials retained in a phenolic matrix. The relative limited wear is not unexpected, as a vehicle is stationary when a parking brake application is applied and as a result frictional wear normally does not occur. However, current safety standards require a park brake to also be capable of functioning as an emergency brake and have an ability to achieve a minimum of six rolling stops from a speed of 18.6 miles per hour. In order to meet this requirement, it is not uncommon for an actuation force of approximately 100 Kg must be applied to bring brake shoes into engagement with a drum.

It is not uncommon for the drum-in-hat parking brake to be assembled at one place and later installed on a vehicle in another location through a brake cable connection such as disclosed in U.S. Pat. No. 5,174,170 or U.S. patent application Ser. No. 10/171,142 filed Jun. 13, 2002. Since it may be difficult and time consuming to install a brake cable to the actuator on an assembly line as such assembly is essentially a blind entry, it has been suggested that a stub linkage be provided with a drum-in-hat assembly the end thereof later joined to a brake cable by a crimp connection. Unfortunately the stub linkage and crimp connection can add cost of the overall brake assembly and as a result customers would prefer a different solution to this situation. A linkage as disclosed in U.S. patent application Ser. No. 10/323,321 addresses and provides a solution to some of the problems in the prior art type connections but requires certain dexterity to join the linkage to a brake cable.

SUMMARY OF THE INVENTION

A primary object of the present invention is to provide a simple low cost linkage for joining a brake cable to an actuator in a drum-in-hat park brake.

According to this invention, in a drum-in-hat park brake assembly for a vehicle having a first brake shoe and a second brake shoe that are respectively retained on a backing plate that is secured to said vehicle. The first brake shoe and said second brake shoe each have a first web with a first engagement end and a second engagement end. The first engagement end of each of the first and second webs are aligned with an anchor while the second engagement end of each of the first and second webs are spaced apart by an actuator assembly. Springs attached to the first and second webs urge the first and second webs toward the anchor and the actuator assembly. The actuator assembly including a housing with a first end that engages the first web and a second end that engages the second web. A lever that is pivotally retained in the housing that has an actuation transmission surface on a first end that engages the first web and a second end with a first hook thereon. The actuation transmission surface transmits an actuation force from an operator into first engagement end of the first web while the housing transmits the actuation force into the first engagement surface of the second web to move first and second friction members associated with the first and second brake shoes into engagement with a drum to effect a brake application. The actuator assembly is characterized by linkage that connect a cable for communicating the actuation force from an operator to a hook on the lever of the actuator. The linkage is formed from a substantially continuous wire to define a first engagement section that is separated from a second engagement section by a center section. The continuous wire has first and second parallel legs that extend a first distance from a base of the first engagement section and thereafter converge toward a plane that is perpendicular to a center of the base to define a first loop that extends from the center section. The first loop is connected to the first hook on the lever. The parallel legs thereafter extend from the first loop along the plane for a desired length to a first tangent point to define the center section. The parallel legs thereafter extending from the first tangent point along an arcuate path for at least 135° to a second tangent point to define a first arcuate section. The first and second legs extend from the second tangent along the tangent for a second length from the second tangent point to a third tangent point. At the third tangent point the first and second legs follow a second arcuate path toward said center section for at least 135° until reaching a fourth tangent point to define a second arcuate section. The legs extend from the fourth tangent point along the tangent for a third distance to an end to define a second hook for the second engagement section. The end of the second hook is spaced apart from the center section by a distance that is less than a radius of for first arcuate section and as result a resilient force is required to move the end of the second hook in the plane away from the center section to receive a loop on the cable. The loop is received by the first arcuate section after expanding the end of the second hook away from the center section such that the second loop is now aligned and retained within by the first arcuate section and as a result an actuation force is substantially transmitted from the cable into the center section to move the lever in effecting a brake application.

An advantage of this invention resides in a simple wire formed linkage for joining a brake cable with a lever in an actuator for a drum-in-hat brake assembly.

BRIEF DESCRIPTION OF THE DRAWINGS

FIG. 2 is an enlarged sectional view taken along lines 2—2 of FIG. 1 showing a linkage, made according to the principles of the present invention, for connecting a brake cable to a lever of an actuator to provide an input force for moving first and second brake shoes into engagement with a drum to effect a brake application; and FIG. 3 is an enlarged view of a hook formed on the end of the linkage of FIG. 2.

DETAILED DESCRIPTION

Figure 1:
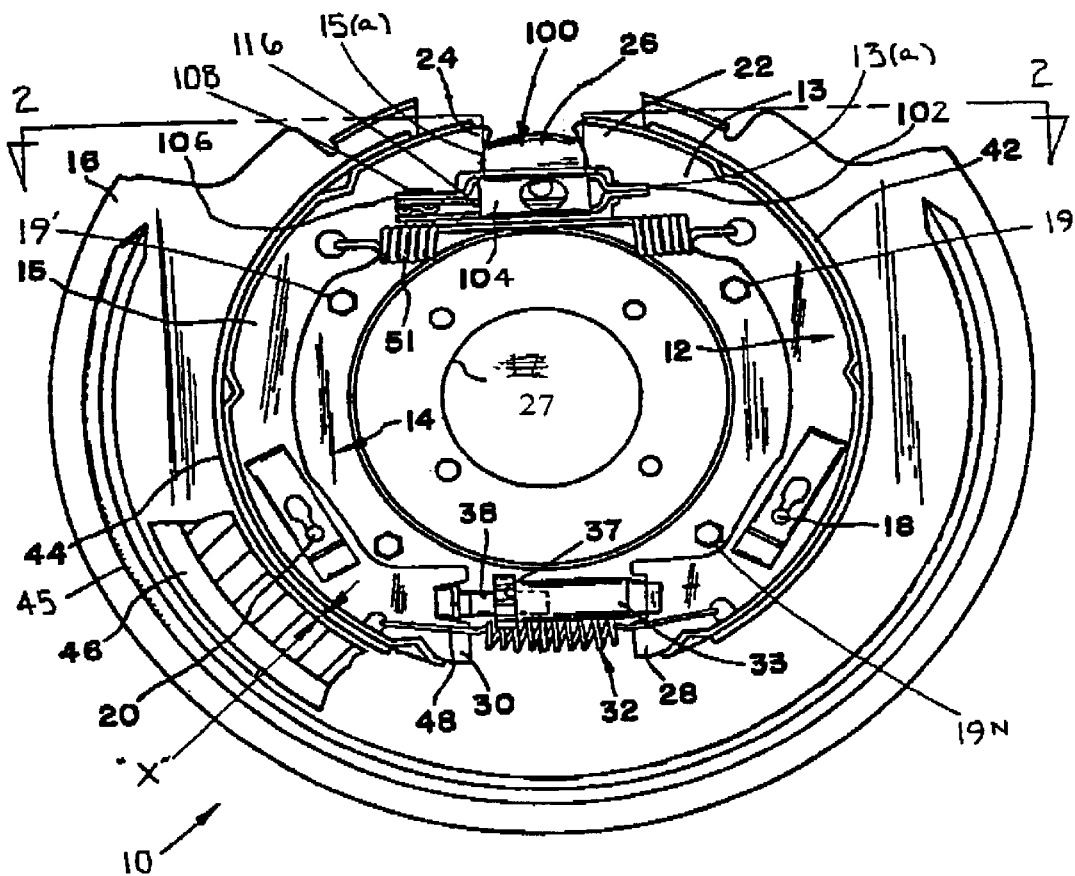
FIG. 1 is a schematic illustration of a drum-in-hat brake for a vehicle.

The drum-in-hat brake 10 shown in FIG. 1 for use in a vehicle is known in the prior art for use in effecting a parking brake application. The drum-in-hat brake 10 is of a type illustrated in U.S. Pat. No. 6,234,281 and includes a backing plate 16 that is fixed by bolts 19,19' ... 19" to a vehicle. The backing plate 16 has an opening 27 therein through which an axle shaft of the vehicle passes with first 12 and second 14 brake shoes retained in radial alignment on the backing plate 16 by first 18 and second 20 pins that are secured to the backing plate 16. Brake shoe 12 has a first end 22 and brake shoe 14 has a first end 24 that, respectively, contact an anchor block 26 attached to the vehicle that extends through the backing plate 16. Further, brake shoe 12 has a second end 28 and brake shoe 14 has a second end 30 that, respectively, contact an adjuster strut mechanism 32. The strut mechanism 32 is of a type as illustrated in U.S. Pat. Nos. 4,502,574 and 5,480,010 that links web 13 on brake shoe 12 with web 15 on brake shoe 14 in such a manner that a force experienced on engagement of either brake shoe 12,14 with drum 46 is directly communicated to the other. During braking, the length of the strut mechanism 32 may be altered by rotating stem 38 and star wheel 37 with respect to cylinder 33 to establish and maintain a predetermined running clearance "x" between a first friction pad 42 on brake shoe 12 and a second friction pad 44 on brake shoe 14 and a drum 46. A resilient arrangement includes: a first spring 51 that connects to the first brake shoe 12 with the second brake shoe 14 to respectively urge the first ends 22,24 toward the anchor post 26 and a second spring 48 that also connects to the first brake shoe 12 with the second brake shoe 14 to urge the second ends 28,30 toward the adjuster strut mechanism 32. An actuator mechanism 100 as illustrated in FIG. 2, of a type disclosed in U.S. Pat. No. 6,234,281, is located adjacent the anchor post 26. Actuator mechanism 100 includes a housing 104 with first end 102 that engages web 13 and a second end 106 end that engages web 15. Ends 102 and 106 are respectively located on ledges in web 13 and 15 and have a length there between such that when the first ends 22,24 engage anchor 26, ends 102 and 106 also engage corresponding faces 13a and 15a on webs 13,15. A lever 116 of actuator mechanism 100, is located in housing 104 by a pin 108. Lever 116 has a cam surface that engages web 15 and a hooked end 110 that is located between the first end 102 and the second end 106 for receiving a loop 202 of a linkage 200 that connects the lever 116 to a park brake actuation cable 300 in the vehicle.

Linkage 200 as best shown in FIGS. 2 and 3 is formed from substantially continuous steel wire having a tensile strength of 1308 MPa. The linkage 200 has a first engagement section defined by loop 202 that is separated from a second engagement section defined by a hook 220 by a center section. The continuous wire has first 206 and second 208 parallel legs that extend a first distance from a base 210 of loop 202 and thereafter converge toward a plane that is perpendicular to a center of the base 210 to define the loop 202 that extends from the center section. The parallel legs 206,208 extending from loop 202 along the plane for a desired length to a first tangent point 222. The desired length of the center section is not fixed but may be adjusted a function of the width of the brake drum 46 and shape of the backing plate 16. The parallel legs 206,208 extend from the first tangent point 222 along an arcuate path having a radius "$R_1$" for at least 135° to a second tangent point 224 to define a first arcuate section and from the second tangent point 224 a second distance to a third tangent point 226. The length of the second distance is about equal to the length of loop 302 on the end of cable 300. The parallel legs 206,208 extend from the third tangent point 226 along a second arcuate path having a radius "$R_2$" toward the center section for at least 135° to a fourth tangent point 228 to define a second arcuate section, and from the fourth tangent point 228 a third distance to an end 230,230' to define a hook 220 for the second engagement section. The ends 230,230' for hook 220 are spaced apart from the center section a distance that is less than twice the radius "$R_1$" of the first arcuate section from the first tangent point 222 such that a resilient force is required to move ends 230,230' of the hook 220 in the plane away from the center section before loop 302 on cable 300 is received into the first arcuate section.

Method of Attachment

The linkage 200 is connected to hook 110 of lever 116 in the following manner:

A grommet 304 is placed on the center section and loop 202 is pushed through opening 17 in backing plate 16 and base 210 is placed on hook 110. Opening 17 is aligned with housing 104 such that with base 210 on hook 110, the second section of the linkage 200 is located in a plane that is perpendicular to backing plate 16 and lever 116. The hook 220 is located outside of the backing plate 16 and is ready for attachment with cable 300.

Cable 300 is attached to linkage 200 by loop 302 initially engaging the second arcuate section and a linear force is applied that pulls loop 302 from the fourth tangent point 228 toward the center section such that the parallel legs 206,208 beyond the first tangent point 222 flex to allow end 230 on hook 220 to expand away from the center section and permit loop 302 to move past end 230 and be pulled into the first arcuate section of hook 220. Once loop 302 is located in the first arcuate section of hook 220, the parallel legs 206,208 flex back into a position illustrated in FIG. 3 and end 230 because of the space relationship with the center section now locks and retains the loop 302 on hook 220. As best illustrated in FIG. 2, loop 202 on the first engagement section of linkage 200 and loop 302 on cable 300 are located in parallel planes that are offset a distance equal to radius "$R_1$" of the first arcuate section. The strength of the single wire is such that a resultant of an actuation force applied to cable 300 is not sufficient to move end 230 of hook 220 away from the center section such that a connection failure would occur between linkage 200 and cable 300. Thus, substantially an entire actuation force applied to cable 300 is communicated through linkage 200 to move lever 116 in affecting a brake application.

To initiate a parking brake application, an input force is applied to cable 300 such that loop 302 pulls on the first arcuate section of hook 220. This input force is transmitted from the arcuate section to the center section and loop 202 to act on the hooked end 110 of lever 116 causing lever 116 to pivot on pin 108 and produce an expanding force in the actuator mechanism 100. The expanding force is characterized by a first force that is communicated through end 102 into web 13 and a second force, that is communicated through the cam or engagement surface on the lever 116 into web 15. The expanding force moves the first 12 and second 14 brake shoes toward surface 45 on drum 46 and when the friction pads 42 and 44 contact surface 45 on drum 46 frictional engagement occurs. The frictional engagement is a direct function of the input force applied to cable 300 and is designed to hold the brake drum 46 stationary with respect to an axle of the vehicle.

When the operator desires to terminate the parking brake application, the input force applied to cable 300 is terminated such that return springs 48 and 51 act on webs 13,15 to move the friction pads 42,44 away from engagement surface 45 and return to their running clearance position.

I claim:

1. In a drum-in-hat park brake assembly for a vehicle having a first brake shoe and a second brake shoe that are respectively retained on a backing plate that is secured to said vehicle, said first brake shoe and said second brake shoe each having a first web with a first engagement end and a second engagement end, said first engagement end of each of said first and second webs being aligned with an anchor and an actuator assembly while said second engagement end of each of said first and second webs being spaced apart by an adjuster mechanism, spring means attached to said first and second webs for urging said first and second webs toward said anchor, actuator assembly and adjuster mechanism, said actuator assembly including a housing with a first end that engages said first web and a second end that engages said second web, a lever that is pivotally retained in said housing that has an actuation transmission surface on said first end that engages said second web and a second end with a first hook thereon, said actuation transmission surface transmits an actuation force from an operator into the second engagement end of said first web while said housing transmits said actuation force into the first engagement end of said second web to move first and second friction members associated with said first and second brake shoes into engagement with a drum to effect a brake application, said actuator assembly being characterized by a linkage connected a cable for communicating said actuation force to said hook, said linkage being formed from a substantially continuous wire with a first engagement section that is separated from a second engagement section by a center section, said continuous wire having first and second parallel legs that extend a first distance from a base of said first engagement section and thereafter converge toward a plane that is perpendicular to a center of said base to define a first loop that extends from said center section, said first loop being connected to said first hook on said lever, said parallel legs extending from said first loop along said plane a desired length to a first tangent point to define said a desired length for said center section, said parallel legs thereafter extending from said first tangent point along a first arcuate path for at least 135° to a second tangent point to define a first arcuate section, from said second tangent point a second distance to a third tangent point, from said third tangent point along a second arcuate path toward said center section for at least 135° to a fourth tangent point to define a second arcuate section, and from said fourth tangent point a third distance to an end to define a second hook for said second engagement section, said end of said second hook being spaced apart from said center section a distance that is less than a radius of said first arcuate section such that a resilient force is required to move the end of said second hook in said plane away from said center section, said cable being defined by a second loop that is received by said first arcuate section after expanding said end of said second hook away from said center section such that said second loop is now aligned within and retained by said first arcuate section and as a result said actuation force is substantially transmitted from said cable into said center section to move said lever in effecting said brake application.

2. The drum-in-hat park brake assembly as recited in claim 1 wherein said center section of said linkage and said cable are in substantially parallel planes such that a resultant of said actuation force is not sufficient to move said end of said second hook away from said center section.

3. The drum-in-hat park brake assembly as recited in claim 2 wherein said second loop initially engages said second arcuate section and is guided toward said center section before acting on said third distance of said parallel legs to resiliently moves said end of said second hook and allow said second loop to be pulled into said first arcuate section.

4. The drum-in-hat park brake as recited in claim 3 wherein said first loop and said second loop are located in parallel planes that are offset by a distance that equals to said radius of said first arcuate section.

* * * * *